UNITED STATES PATENT OFFICE.

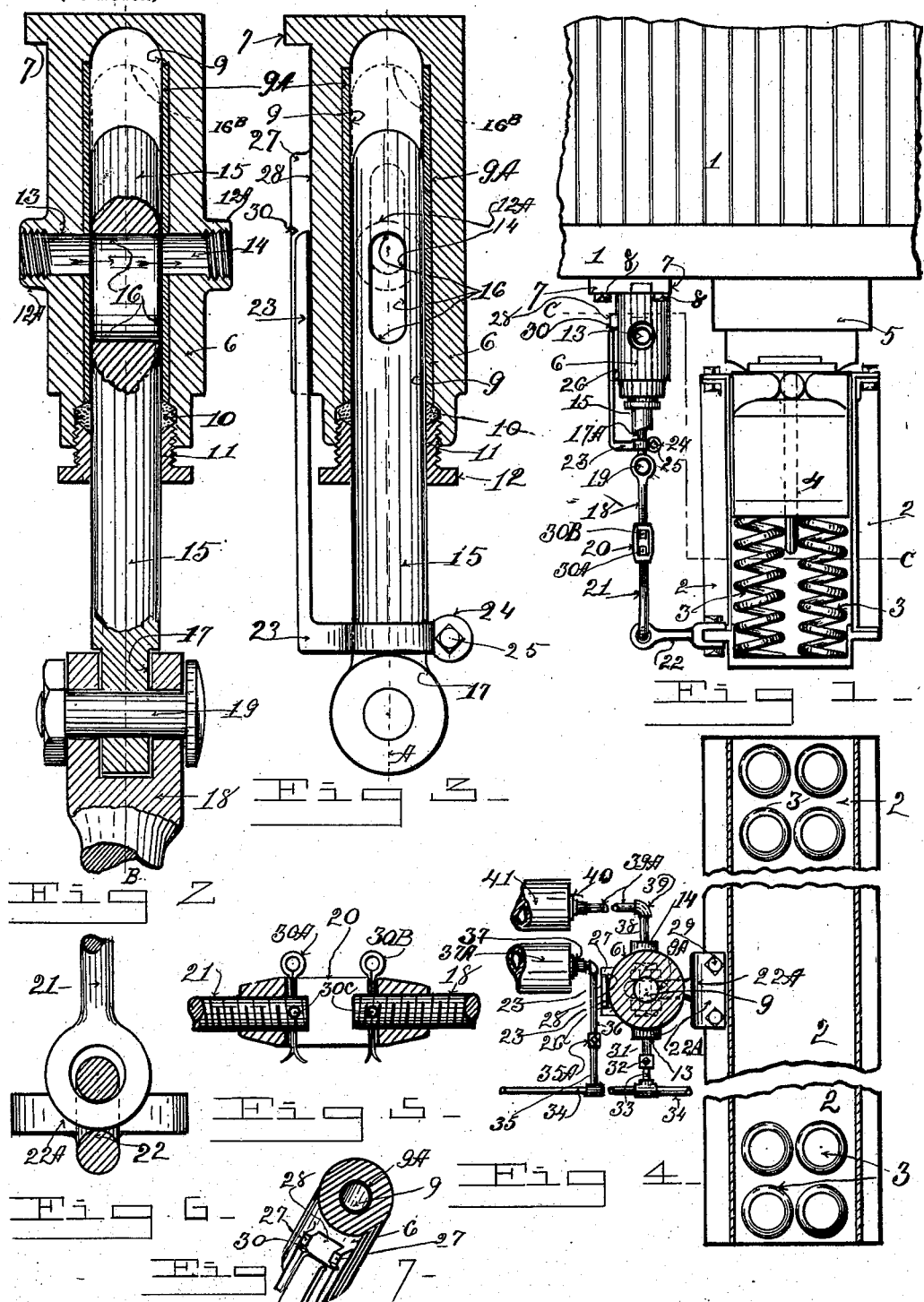

WILLIAM H. SAUVAGE, OF DENVER, COLORADO, ASSIGNOR, BY DIRECT AND MESNE ASSIGNMENTS, TO THE SAUVAGE DUPLEX AIR BRAKE COMPANY, OF SAME PLACE.

FREIGHT-OPERATING CAR-BRAKE.

SPECIFICATION forming part of Letters Patent No. 670,377, dated March 19, 1901.

Application filed April 27, 1900. Serial No. 14,624. (No model.)

*To all whom it may concern:*

Be it known that I, WILLIAM H. SAUVAGE, a citizen of the United States of America, residing at Denver, in the county of Arapahoe and State of Colorado, have invented certain new and useful Improvements in Freight-Operating Car-Brakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in freight-operating brakes for freight-cars; and the objects of my invention are, first, to provide a freight-operating air-brake mechanism that is operated by partial or entire weight of the freight on a car; second, to provide a simple air-releasing valve and indicating mechanism, and, third, to provide means for adjusting the several parts of my brake mechanism. I attain these objects by the mechanism illustrated in the accompanying drawings, in which—

Figure 1 is a fragmentary view of a freight-car and its truck with my improved freight-operating brake mechanism. Fig. 2 is an enlarged sectional view of the air-release valve through the air inlet and exit ports and on line A of Fig. 3. Fig. 3 is a sectional view of the valve on line B of Fig. 2. Fig. 4 is a fragmentary plan view of Fig. 1. Fig. 5 is a fragmentary view of the valve-adjusting device. Fig. 6 is a fragmentary view of a connecting-joint. Fig. 7 is a fragment of the valve-cylinder, showing the indicating-lever and its slideway.

Similar numerals of reference refer to similar parts throughout the several views.

Referring to the drawings, the numeral 1 designates the body of a freight-car; 2, the bolster; 3, the springs; 4, the lag-bolt, and 5 the truck-timbers of the car.

6 designates a valve-cylinder. Its top is provided with a flange portion 7, which I secure to the bottom of the car by bolts 8. An axial bore 9 extends into the cylinder from one end to near its opposite end. This bore is bushed by a bushing $9^A$ that will not rust, such as brass or gun-metal. At its entrance a stuffing-box 10 is formed in a projecting hub portion, and a gland 11, which has a nut portion 12 threaded into the stuffing-box. At the central portion of the valve-cylinder there is a hub on each opposite side, and an air-inlet port 13 and exit-port 14 extends axially through the hubs and enters the bore of the cylinder. A valve 15 extends through the gland and stuffing-box into the cylinder. This valve-stem has a port 16 formed in it at a short distance from its upper end, and the end of the valve-stem is made long enough beyond the port 16 to enable the valve-stem to close the transverse air inlet and exit ports of the cylinder when the cylinder moves up and down on the valve-stem under the movement of the car. This port 16 is several times larger than the air inlet and outlet ports, so that the valve-stem can move quite a distance into the cylinder to close to the top of its bore, as indicated by the dotted lines $16^B$ in Figs. 2 and 3, and the port-register opposite the air inlet and outlet port. The valve extends bleow the stuffing-box far enough to allow it to project into the valve-cylinder the whole length of the cylinder's bore, and at its end it may be reduced, as shown at 17 and 18, and pivotally connected to one end of a rod 18 by a bolt 19. The opposite end of this rod 18 is threaded to one end of a turnbuckle 20. The opposite end of this turnbuckle is threaded to one end of a rod 21, the opposite end of which is pivotally secured by, preferably, a ring-joint to one end of a clip 22, which also is provided with an eye. This ring-joint is preferably arranged at right angles to the joint between the valve-rod 15 and the rod 18, and in order to hold the valve-stem so that it will not turn when the turn-buckle is turned and also that its port will always stand in alinement with the air inlet and outlet port I secure to the valve-stem, adjacent to its connection with the rod 18, a guide and indicating lever 23, which surrounds the stem by a loop portion 24, that is bolted to it by a bolt 25. This lever extends from the valve-stem at right angles to its axis a short distance and then turns and extends up alongside of the cylinder, where it enters a slideway 26, formed by the projecting sides 27 and the flat portion 28. The end of the lever is arranged to bear close against the bottom and sides of the slideway, so that there will not be any unnecessary play between it and the slideway.

The clip 22 has its opposite end from the eye-joint bifurcated or yoke-shaped, so that it will straddle the projecting flange of the bolster, to which it is rigidly bolted by the bolts 29.

The turnbuckle is used to adjust the valve-stem to normally stand with the air-inlet ports closed when the car is empty of freight and also with a little leeway, so that a little down movement of the car and cylinder will be necessary to bring the ports to register opposite one another.

In order that a trainman may be able to tell just where the top of the port of the valve-stem is arranged, an indicator on the cylinder and piston indicates its height inside of the cylinder. I accomplish this by extending the end of the lever 23 to the same height as the top of the port in the valve-stem, and in the sides of the slideway I also cut a V-notch 30 even with the top of the air-inlet port of the cylinder. Consequently when the end of the lever registers even with the notch the air-inlet and valve-stem and air-exit ports are all wide open.

The valve-stem is set so that its port stands below the air-inlet port far enough so that when a car is empty of freight it will be a short distance below the air-inlet port and so that when a car is about half-loaded with freight it will depress the bolster-springs and the cylinder will move down on the valve-stem enough to partially open the air-port through it, and when the car is loaded the cylinder will move down on the valve-stem enough to fully open the air-port. This adjustment of the valve-stem is accomplished by the turnbuckle, which makes an adjustable connection between the ends of the coöperating rods, as neither one of these rods can turn, and when the turnbuckle is turned it either raises or lowers the valve-stem. Consequently the valve-stem can be quickly adjusted to its proper position when it is first placed on a car and in a few minutes at any time afterward by an ordinary trainman should the wear and settlement of the springs and parts of the bolster make it necessary.

The turnbuckle is secured against accidental turning by collar-pins $30^A$ and $30^B$, which are inserted in holes $30^C$, which may be drilled in several directions through the ends of the rods that extend into the turnbuckle.

From the air-inlet port a pipe 31 extends to a cut-out valve. A pipe 33 extends to a pipe 34, which is a fragment of the train-pipe. This pipe is the air-supply pipe that extends under every car fitted with an automatic air-brake system. From this train-pipe a pipe 35 extends to a cut-out valve, and from this valve a pipe 36 extends to a triple valve 37, which is attached to an air-reservoir, which is the general or regular reservoir of the brake system which, with the triple valve and the train-pipe and connections are common to all automatic air-brake systems. From the air-exit of the valve-cylinder a pipe 38 extends to an elbow 39 and from this elbow to a triple valve 40, which is attached to a fragment of a supplementary reservoir 41. Both the general and supplementary reservoirs are preferably combined with cylinders and pistons which are connected with the train-brake-service mechanism. In Fig. 4 only a fragment of the reservoirs and train-pipes are shown, as the rest is common to all automatic air-brake systems and is, moreover, fully illustrated and described in my application for a patent, Serial No. 4,069, filed February 5, 1900.

The operation of my automatic freight-weight car-braking device is as follows: Assuming that the car is empty and that the car and train-pipe are operatively connected in a train to a locomotive-engine and to the main air-reservoir and to the pump, the train-pipe is filled with air under pressure, which is constantly flowing into it from the pumps and main reservoir. This air flows unobstructed into the pipes that lead from the train-pipe to the triple valve of the general reservoir 37 and through this valve into this reservoir in the manner common to the Westinghouse system. Now if the car is loaded or partially loaded with freight the weight of the freight will cause the car to sink down on the springs and the valve-cylinder will lower with the car and the ports in the valve-cylinder will be moved down over the port in the valve-stem, and if the car is loaded heavy enough the cylinder will be moved down far enough to allow its ports to register opposite the port in the valve-stem, and thus make a clear passage through the cylinder and valve-stem for the air which flows on to and through the triple valve 40 into the supplementary reservoir 41, thus keeping it operatively charged. When the engineer wishes to apply the brakes, he simply reduces the pressure of the air in the train-pipe in the manner common to the Westinghouse system from one to a number of pounds per square inch. Now if the cylinder and brake levers of the car are arranged and set to exert a brake-pressure of four thousand eight hundred pounds to the brakes the supplementary cylinder adds as much more if it is of the same size and more if it is larger, providing the brakes are properly attached to it. It can also be made to add several times the power exerted by the general reservoir and its cylinder by connecting it to the brake-levers, as shown in the application above mentioned. My present invention differs from that, however, in the valve and its connection with the bolster.

In my present invention the valve is placed as close to the bolster or truck as it can be, while in my other application it is placed near the center of the length of the car. My present valve is always open under a quarter or half or three-quarters or full load, depending on the adjustment of the valve-stem and its connection with the bolster. It is much simpler and is more direct, while the joints between the bolster and the valve-stem are arranged to allow universal movement of the car and bolster without cramping the valve-stem.

Having described my invention, what I claim as new, and desire to secure by Letters Patent, is—

1. In a freight-operating car-brake, the combination with the general reservoir and the train-pipe operatively connected, of a pipe connected at one end to said train-pipe, a cut-out valve connected to the opposite end of said pipe, a pipe connected at one end to said cut-out valve, an air-release-valve cylinder connected to the opposite end of said pipe and secured to the bottom of a freight-car, a valve-stem reciprocately mounted in said cylinder, an adjustable connection between said valve-stem and the bolster or lever supporting members of said car, and a supplementary reservoir operatively connected to said air-release-valve cylinder and arranged to receive air from it and secured to the bottom of said car, substantially as described.

2. In a freight-operating car-brake, the combination with the train-pipe and the general reservoir, of an air-release-valve cylinder secured to the bottom of a freight-car close to the wheel-trucks, a valve-stem operatively mounted in said cylinder, a flexible and adjustable connection between said valve-stem and the bolster of the trucks, with an air-pipe connection between said valve-cylinder and said train-pipe, an air-conveying pipe connected to said valve-cylinder and a supplementary reservoir and triple valve operatively connected to said air-conveying pipe, substantially as described.

3. In a freight-operating car-brake, the combination with the general reservoir and train-pipe, of a valve-cylinder connected to the bottom of a freight-car and adapted to be raised and lowered with the car as it is fluctuated on the springs of its truck-bolster under varying loads of freight, a valve-stem operatively mounted to reciprocate in said valve-cylinder, an air-inlet port into said valve-cylinder, an air-discharge port in said valve-cylinder opposite said air-inlet port, a port in said valve-stem arranged in alinement with said air inlet and outlet ports, a vertically-adjustable support for said valve-stem connected at one end to the bolster of the truck of said car, and at the opposite end to said valve-stem; suitable pivotal joints between said valve-stem and said vertically-adjustable supports and said bolster to compensate for the swaying motions of said car and truck, a supplementary reservoir and triple valve attached to said car and a suitable pipe connection between said valve-cylinder and said supplementary reservoir, substantially as described.

4. In a freight-operating air-brake, the combination with the general reservoir and train-pipe, of a valve-cylinder connected to the bottom of a freight-car and adapted to be raised and lowered with the car as it is fluctuated on the springs of its truck-bolster under varying loads of freight, a valve-stem operatively mounted to reciprocate in said valve-cylinder, an air-inlet port into said valve-cylinder, an air-discharge port in said valve-cylinder opposite said air-inlet port, a port in said valve-stem arranged in alinement with said air inlet and outlet ports, a vertically-adjustable support for said valve-stem connected at one end to the bolster of the truck of said car, and at the opposite end to said valve-stem; suitable pivotal joints between said valve-stem and said vertically-adjustable supports and said bolster to permit said ports to constantly stand in operative relation to said cylinder during the swaying motions of said car and truck, a supplementary reservoir and triple valve attached to said car, a suitable pipe connection between said valve-cylinder and said supplementary reservoir, a slideway on said valve-cylinder, a mark on said slideway indicating the top of the air-inlet port of said valve-cylinder, and an indicating-rod secured to said valve-stem and arranged and adapted to fit in said slideway to prevent said valve-stem turning in said valve-cylinder, substantially as described.

5. The combination with a freight-car and its trucks, the general reservoir, the triple valve and the train-pipe, with a supplementary reservoir and triple valve operatively attached to a freight-car, an air-pressure-supply pipe connecting said supplementary reservoir with said train-pipe, a valve in said air-pressure-supply pipe between said train-pipe and said supplementary reservoir and connected to the bottom of a freight-car, a valve-stem operatively supported by and attached to the bolster portion of the trucks of a freight-car and operatively mounted in said valve-cylinder, an air inlet and exit port arranged in said cylinder, an air-passage port in said valve-stem in operative relation to close or open the air inlet and exit ports of said cylinder by the vertical movement of said car on its trucks under partial or whole loads of freight, means for vertically adjusting said valve-stem in operative position in said cylinder, means including suitable joints for adjusting said valve-stem to permit of the independent swaying movement of said car and truck and means connected with said valve-stem adapted to indicate the relative positions of said valve-stem and cylinder-ports, substantially as described.

6. The combination of the freight-car, the trucks, the general reservoir and the train-pipe with the supplementary reservoir, of the valve-cylinder attached to said car, the pipe connecting said valve-cylinder and supplementary cylinder together, the valve-stem in said cylinder, the air inlet and outlet ports on opposite sides of said cylinder and the air-passage through said valve-stem, a rod pivotally attached at one end to said valve-stem, a turnbuckle threaded at one end to the opposite end of said rod, a second rod threaded to the opposite end of said turnbuckle, means for securing said turnbuckle in a set position against accidental displacement, a clip pivotally secured at one end to the opposite end of said second rod, and rigidly secured at its opposite end to the bolster of a freight-car, substantially as described.

7. The combination of the freight-car, the trucks, the general reservoir and the train-pipe, with the supplementary reservoir, of the valve-cylinder attached to said car, the pipe connecting said valve-cylinder and supplementary cylinder together, the valve-stem in said cylinder, the air inlet and outlet ports on opposite sides of said cylinder and the air-passage through said valve-stem, a rod pivotally attached at one end to said valve-stem, a turnbuckle threaded at one end to the opposite end of said rod, a second rod threaded to the opposite end of said turnbuckle, means for securing said turnbuckle in a set position against accidental displacement, a clip pivotally secured at one end to the opposite end of said second rod and rigidly secured at its opposite end to the bolster of a freight-car, a flat surface or slideway on said cylinder, a lever secured to said valve-stem, a flat end on said lever arranged to engage said flat surface or slideway, a mark on said cylinder at the height of said air-inlet port and having the end of said lever arranged and adapted to indicate on the outside of said cylinder the height of the port in said valve-stem, substantially as described.

In testimony whereof I affix my signature in presence of two witnesses.

WILLIAM H. SAUVAGE.

Witnesses:
C. A. DUNN,
BESSIE THOMPSON.